Oct. 26, 1926.
1,604,837
C. W. MORDEN
BED ATTACHMENT FOR COVERED VEHICLES
Filed Dec. 27, 1923    4 Sheets-Sheet 1
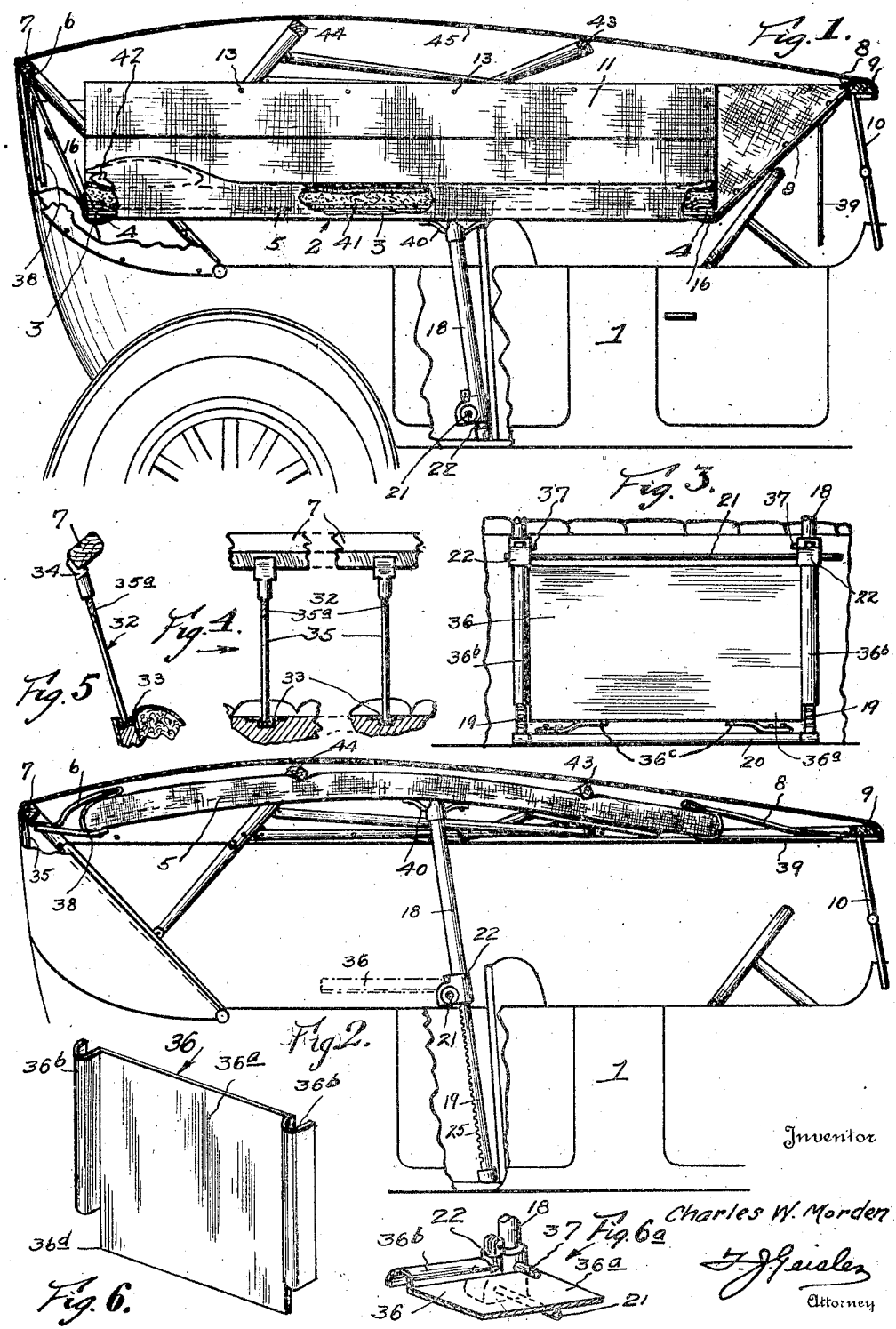

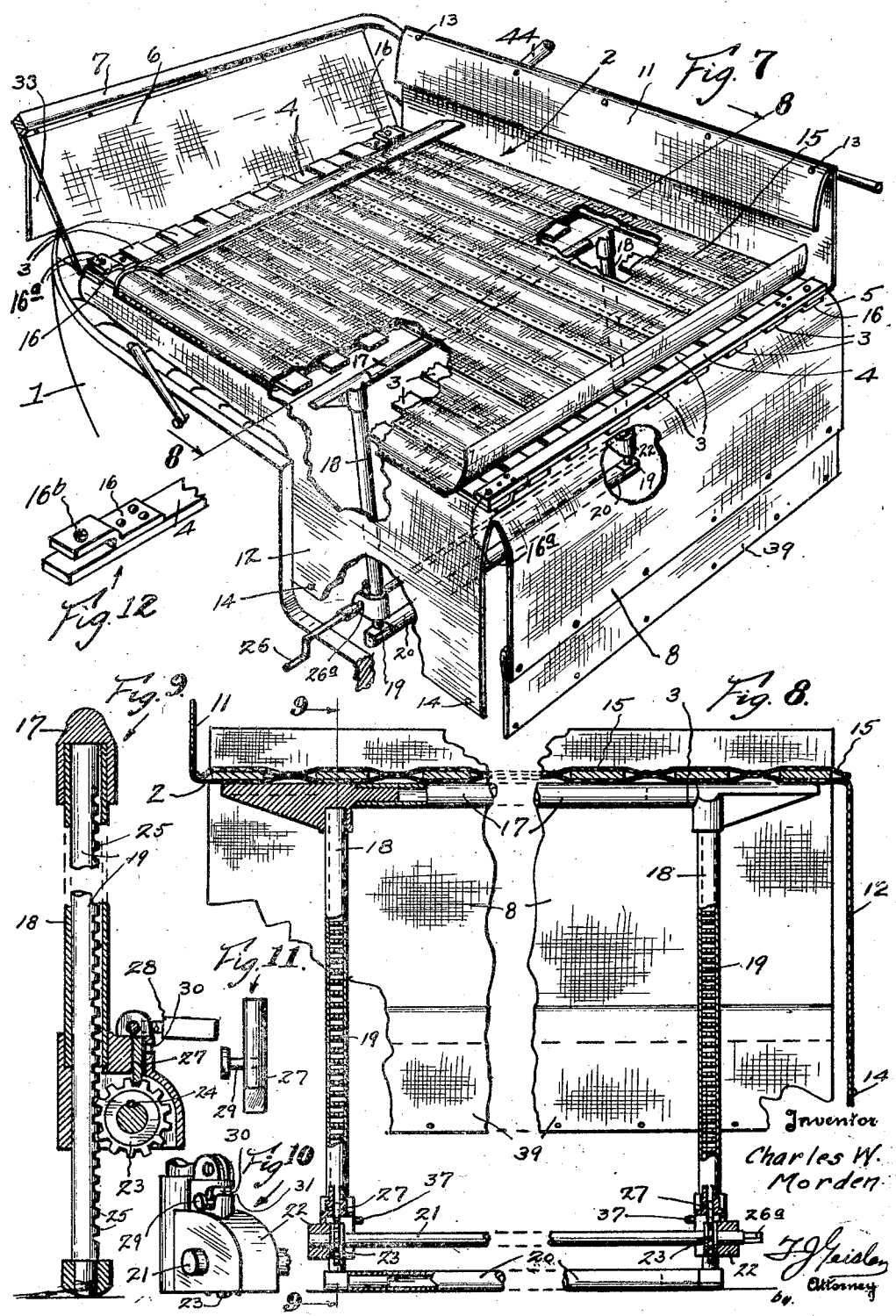

Oct. 26, 1926.  
C. W. MORDEN  
BED ATTACHMENT FOR COVERED VEHICLES  
Filed Dec. 27, 1923     4 Sheets-Sheet 3  
1,604,837
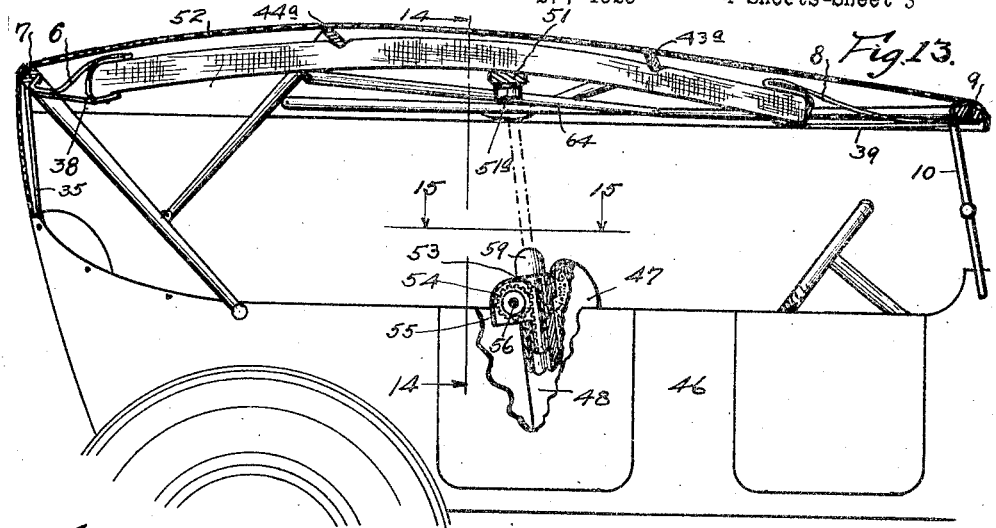
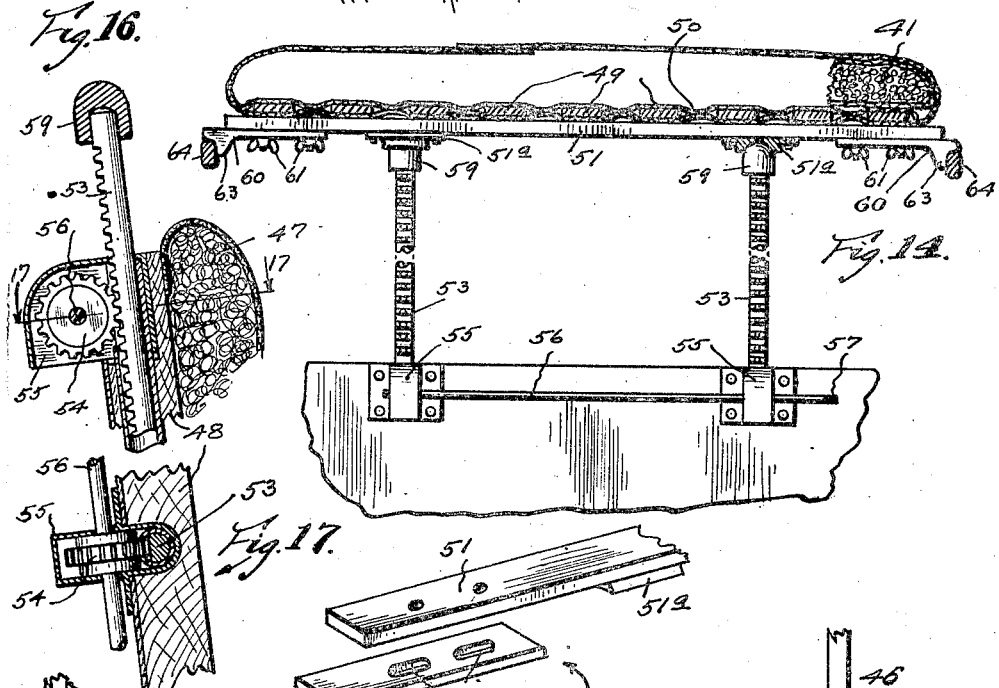
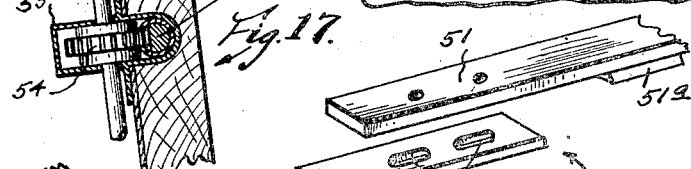
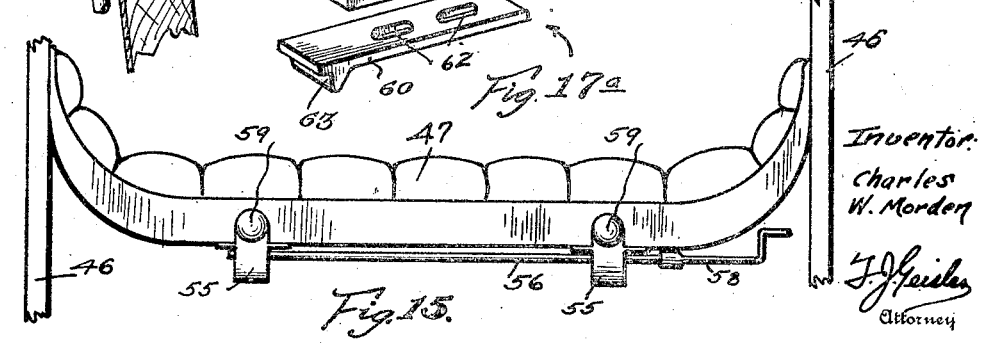
Inventor:  
Charles W. Morden  
Attorney Oct. 26, 1926. 1,604,837
C. W. MORDEN
BED ATTACHMENT FOR COVERED VEHICLES
Filed Dec. 27, 1923  4 Sheets-Sheet 4
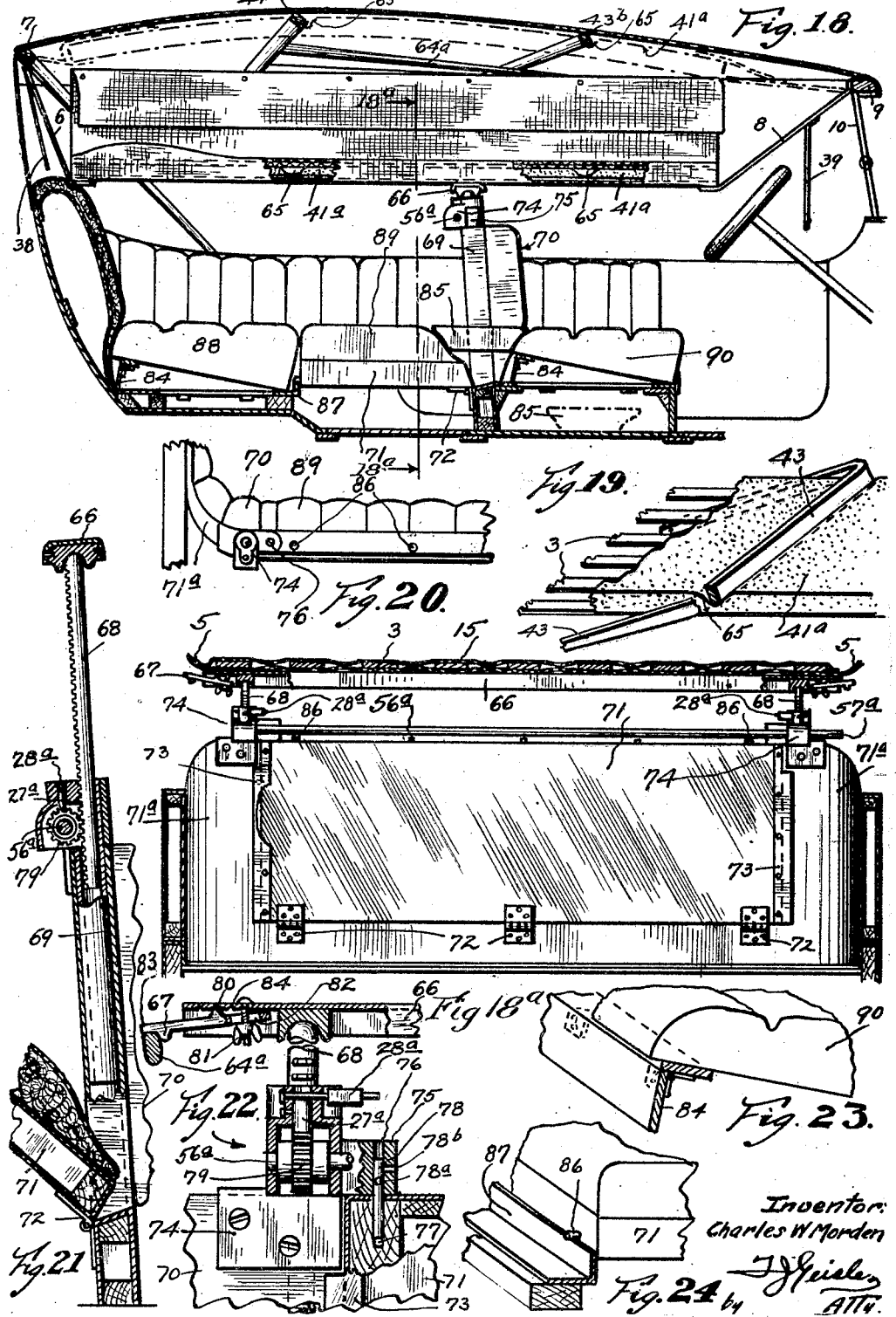

Patented Oct. 26, 1926.

1,604,837

UNITED STATES PATENT OFFICE.

CHARLES W. MORDEN, OF WEST LINN, OREGON.

BED ATTACHMENT FOR COVERED VEHICLES.

Application filed December 27, 1923. Serial No. 682,928.

My invention relates to a bed attachment for covered vehicles, specifically, for example, for motor vehicles.

The object of my invention is to provide a comfortable bed inside of the vehicle which bed, when not in use, may be elevated and stowed fully extended directly under the top of the vehicle, so that the bed and bedding will occupy no space in the tonneau or body of the vehicle, and will be substantially concealed from view; and furthermore to provide this bed and its accessories in the form of an attachment which may be installed in the vehicle without any change being required in the construction or remodeling of the latter.

Since the bed is to be elevated for stowage directly under the top of the vehicle, and is to be lowered for occupancy to a position above the seats of the vehicle, a further object of my invention is to provide a means for raising and lowering the bed which may also serve to hold the bed in its elevated position, and to help to support it in its lowered position.

Further objects of my invention are to provide a bed which is light, inexpensive to manufacture, has few parts, and at the same time is of sturdy construction; also a bed which can be placed into and out of position, for occupancy, conveniently and expeditiously, and which has minimum thickness in order to provide maximum head room in the vehicle, when the bed is elevated to its position of stowage directly under the top of the vehicle.

Another object is to provide the bed with curtains which are adapted to be arranged over the bed like a cover when the bed is not in use and also to enclose the space between the top of the vehicle and the bed when the latter is arranged for occupancy.

Another object is so to construct one form of my bed and its associated devices that the same may be sold as an attachment for any standard automobile.

The details of the construction, arrangement and operation of my invention, so as to attain the above described objects, and others incidental thereto, are hereinafter fully described with reference to the accompanying drawings, in which:

Fig. 1 is a fragmentary elevation of an automobile provided with my improved bed, which is here shown as positioned when arranged ready for occupancy; this view also illustrates the arrangement of side flaps which may be used as curtains for screening the space between the bed and the top cover of the vehicle;

Fig. 2 is a similar view of an automobile showing my bed as raised to its out of the way position, under the top cover of the car; this view further illustrates specific features of the devices for raising and lowering the bed;

Fig. 3 is a fragmentary elevation of the front seat of the vehicle as viewed from the back seat, and illustrates features of the devices provided for raising and lowering the bed;

Fig. 4 is a fragmentary elevation of supports which are preferably provided at the back of the automobile for supporting that end of the automobile top;

Fig. 5 is a similar fragmentary view taken at right angles to Fig. 4, and further illustrates said supports;

Fig. 6 is a perspective view of a removable housing for the lower ends of the devices provided for raising and lowering my bed;

Fig. 6ª shows a detail of a mode in which said housing may be supported and utilized as a table;

Fig. 7 is a perspective view of my bed and a portion of the automobile in which installed, the bed structure being shown in lowered position;

Fig. 8 is a transverse section taken on the line 8—8 of Fig. 7, this view particularly illustrates the construction and operation of the devices for raising and lowering the bed;

Fig. 9 is a sectional detail of construction, taken on the line 9—9 of Fig. 8, and shows the devices for raising and lowering my bed;

Figs. 10, 11 and 12 illustrate details of construction hereinafter fully described;

Fig. 13 is a side elevation, partly in section, of an automobile provided with my bed structure in stowed position, said figure shows modified devices for raising and lowering my bed which are adapted to be lowered and concealed in the body of the vehicle;

Fig. 14 is a transverse section taken approximately on the line 14—14 of Fig. 13, showing the bed structure in stowed position under the top of the vehicle, the top, however, not being shown;

Fig. 15 is a fragmentary plan view taken approximately on the line 15—15 of Fig. 13, thus looking down on the back of the front seat, this figure illustrates the arrangement of the devices for raising and lowering my bed when said modified devices are lowered and concealed in the body of the vehicle;

Fig. 16 is a fragmentary sectional view through the front seat, and shows the modified devices for raising and lowering my bed;

Fig. 17 is a sectional view taken on the line 17—17 of Fig. 16;

Fig. 17a is a perspective detail of supplementary means for supporting the bed at the middle of its sides when arranged out of the way, under the top cover of the vehicle;

Fig. 18 is a fragmentary sectional side elevation of an automobile provided with my bed and illustrates further that the back of the front seats of the automobile is hingedly fastened to the seat portion so as to be susceptible of being swung into horizontal alinement with the back and front seat portions so as to constitute a lower bed;

Fig. 18a is a vertical section taken on the line 18a—18a in Fig. 18, and shows that the major central portion of the back of the front seat is hinged so as to swing down to form a portion of the lower bed;

Fig. 19 is a fragmentary top view of my bed structure and one bow of the automobile top, and shows a slight modification in the details of my bed structure;

Fig. 20 is a fragmentary plan view of the front seat;

Fig. 21 is a sectional detail of the last mentioned construction of the front seat, and of the devices for supporting the middle of the bed;

Fig. 22 is a larger scaled fragmentary view of a portion of the devices shown in Fig. 18a, parts being shown in section and being shown broken away to disclose details of construction; and Figs. 23 and 24 show details of construction hereinafter fully described.

As already mentioned, my bed may be permanently installed in, and thus form a fixed part of any standard make of automobile, or it may be built to form an accessory to such automobile. I will describe first one preferable construction which conveniently lends itself to the building of my bed into an automobile 1 as an accessory. This mode of carrying my invention into practice is illustrated in Figures 1 to 12 inclusive.

My bed structure is made up of a frame body 2 consisting of a number of parallel spaced slats 3, (see Figs. 1 and 7), held by headers 4 at each end. These slats 3 are slightly flexible but have enough rigidity to hold the weight of the occupants without bending unduly. The frame body is carried in a canvas hammock 5 which is snap fastened at its pendent flap-like end 6, to the back-bow 7 of the automobile top, and is fastened by its other pendent-flap-like end 8 to the bow 9, directly over the wind shield 10 of the automobile. The canvas hammock 5 is also provided with side flaps 11 and 12 at each side. These flaps are adapted to constitute covers for the bed when not in use, and also to provide side curtains adapted to screen the space above the bed when the latter is arranged for occupancy. Said side flaps 11 and 12 are provided with means by which they can be fastened to the sides of the automobile top, when they are to be used as curtains, thus protecting the occupants from the elements; but, of course, these flaps or curtains may be left down so as to provide plenty of fresh air. I provide snappers 13 on the flap 11, and snappers 14 on the flap 12. I enclose the frame body 2, made up of the slats 3 and the headers 4, in a canvas slip 15 which is open at each end, and thus if a slat should be inadvertently broken a new one can easily be substituted. The slats are not permanently fastened to the headers 4 but are removable by removing the screw 16a from the hole 16b therefor provided in the off-set brackets 16, one of which is mounted at each end of the headers 4. The brackets are arranged to maintain said slats in spaced apart relationship so as to stretch the slip holding said bed slats taut in a transverse plane.

To raise and lower my bed, I provide devices consisting of a transverse supporting bar 17, (see also Fig. 8), which is mounted on two spaced tubular legs 18, one at each side of the automobile. The devices are arranged to support the middle portion of the bed, since that carries the greater portion of the weight of the occupant, and incidentally the maintaining of a support in this manner eliminates the necessity of providing a great deal of bracing for the top of an ordinary automobile, to prevent it being affected by the downward pull of my bed. The same devices also are adjustable to support the bed in its out of the way position, directly under the top cover of the automobile. The transverse bar of said devices for supporting the middle of the bed is raised and lowered by means of toothed racks 19 which fit snugly within the bore of the tubular legs 18 and telescope therein. Said racks are connected by a lower tubular member 20 so that the two racks of the lowering means and said tubular member form substantially a U-shaped structure. I provide a rotatable drive shaft 21, which is journaled at each of its ends in housing structures 22 on the lower end of each of the tubular legs 18. I fix operating pinions 23 on each end of this shaft within each of the housing structures 22, these pinions being fastened to the shaft by keys 24. (See Fig. 9.) The pinions 23 mesh with the teeth 25 of the racks 19, and thus the rotation of the shaft 21 and therefore the rotation of the pinions 23 in a counter clockwise direction, as viewed in Fig. 9, causes the pinion and therefore the tubular member 18 to climb relatively upwardly along the notched rack 19 which therefore moves the bed structure upwardly. The opposite rotation of the shaft 21 causes the bed to be lowered. I provide a removable crank 26 which fits on the squared end $26^a$ of the shaft 21 for rotating the shaft. I also provide a locking pawl 27 which may be held in locked position by the padlock 28. This pawl has a projection 29 provided thereon which moves in the slot 30 of the housing structure 22. When this projection 29 is in the bottom of the slot 30 the pawl engages the pinion 23, but when the pawl is moved upwardly in the slot and placed on the flat portion 31 thereof, it becomes disengaged from the pinion 23 and thus permits the operating devices to be moved. I preferably provide auxiliary supporting members 32 which I mount in slight recesses 33 on the top of the back seat. These supports are preferably made in two pieces which are adjustable longitudinally, so that, for example, (see Figs. 4 and 5), the portion thereof constituting a shoe 34 can be placed under the back bow 7 and the other portion constituting a rod 35 rotated and the threads $35^a$ on said rod will extend the parts longitudinally so as to force this support firmly in place, thus eliminating the tendency of these parts to rattle when the car is passing over rough roads. I provide a sheet iron covering or housing 36, the lower end $36^a$ of which is flat and lies between the racks 19. The sides $36^b$ of said covering are longitudinally cupped so as to fit over the two racks 19 so that these parts will be completely covered. This covering or housing is supported by two spaced spring elements $36^c$. I provide projections 37 on the inner faces of both of the housing structures 22 and these projections 37 are arranged slightly above the shaft 21 and slightly to one side thereof. The covering or housing is convertible into a very convenient table by placing the lower end over the shaft 21 and under the projections 37, thus holding this covering in a horizontal plane. The lower end $36^a$ of this sheet iron covering will thus rest on the shaft 21 but will be below these projections 37, and the curved portions $36^b$ which normally surround the tubular legs 18 and the racks 19, will serve to strengthen and support this member 36. I provide shorter auxiliary flaps 38 and 39 fastened to the flap-like ends 6 and 8 of the hammock 5 respectively, and thus when the bed structure is lifted to its uppermost or carrying position, the excess material of the flap-like ends may be taken up and fastened about the mattress and these auxiliary flaps 38 and 39 may be fastened in place so that the under side of the bed presents a relatively smooth continuous surface which is substantially parallel with the under side of the automobile top, but which is spaced therefrom by the thickness of the bed structure and bed clothing carried thereby. These auxiliary flaps 38 and 39 and the under surface of the hammock 5 are preferably made of material such as used for upholstering automobiles and thus the under surface of the bed appears to be the under surface of the automobile top. I preferably fasten the transverse supporting bar 17 to the under surface of the bed structure by means of a flap 40, (Figs. 1 and 2) because the operating devices are arranged to operate at a slight angle with a vertical plane, and this flap 40 will tend to prevent the bar from slipping from place.

The operation of my device is as follows:

The pendent flap-like portion 6 of the bed structure is fastened to the back row 7, and the other similar portion 8 to the bow 9 above the windshield 10 and the bed clothing, such as the mattress 41 and the pillow 42, is placed on the frame body 2 and enfolded in the flaps 11 and 12. The bed clothing, thus may be carried in such a manner as not to be affected by the dust of the road nor by the moisture from the top when the bed is in its stowed position.

To lower the bed the crank 26 is placed on the squared end $26^a$ of the shaft 21, the padlock 28 is removed and the pawl 27 disengaged from the pinion 23. The pinions 23 may then be rotated in a clockwise direction, as shown in Fig. 9, which lowers the bed to a position directly above the seats of the automobile. The rear end of the bed is supported by the pendent flap-like portion 6 against the upright cushion of the back seat and the front end of the bed is supported by the flap-like portion 8 and the bed is supported intermediate its ends by the transverse supporting bar 17. The flaps 11 and 12 can then be removed from about the mattress and bed clothing, and can either be left hanging pendent from the sides or can be fastened into position against the sides of the top so as to screen the space above the bed and below the automobile top. The bed is then made up.

When it is desired to place the bed in out of the way or stowed position the operation is reversed, the bedding first being laid flat on the body and the flaps 11 and 12 folded in their respective positions and the bed then lifted upwardly. As can be noted, the raising and lowering devices are arranged angularly with the bed structure and thus the bed would not be raised perpendicularly but would tend to be moved towards the back of the car. It is also to be noted that the lowering device does not strike the bed at exactly its middle but strikes it slightly closer to the end which is attached to the bow 9 above the windshield 10 and thus this end is lifted first and pivots about the connection between the flap-like portion 8 and the bow 9 until the front end of the bed strikes against the top. The entire bed structure must then be shifted forwardly, being supported by the transverse bar 17. This will shorten the distance between the front end of the bed structure and the bow 9 and thus permits the flap-like portion 8 of the hammock to be folded under the bed, as shown in Fig. 2, and permits the auxiliary flap 39 to be snapped in place. This auxiliary flap 39 then prevents the bed from shifting back into its original position. The continued upward movement of the transverse bar 17 causes the other end of the bed to be lifted until the bed lies in a horizontal plane. The upward movement of the operating device is preferably continued until the bed is flexed as shown in Fig. 2 between the bow 43 and the bow 44. The bed thus does not strike the top covering 45 of the automobile so as to distort the top. The bed is thus carried between the bows 43 and 44 on the top and the transverse bar 17 of the operating device in a flexed position. This eliminates any tendency of the bed or bed clothing to shift or rattle due to the jars of the road. The excess material in the flap-like portion 6 is then folded over the end of the mattress and snapped in place and the auxiliary flap 38 is fastened to the under surface of the hammock.

The bed structure shown in Figs. 13 to 17ª is incorporated in the car when it is built, that is, it is a structure which is not an attachment to a standard automobile but which is a permanent part thereof. In this embodiment the bed structure is incorporated in an automobile 46 which is provided with a front seat 47 which has a hollow back 48 which encloses the operating mechanism and conceals the same when it is not extended. As in the previous figures, the bed structure is made up of a relatively flexible body made of strips 49 and supported by a canvas hammock 50 carried by the front and back bow portions of the automobile top and by a transverse bar 51. The bed and its covering flaps are identical to the ones previously described and thus I will not describe them again but will give to them the same numbers as the ones by which I have referred to the same details in the previous figures.

When my invention is to be installed as a permanent part of a vehicle, I consider it preferable that the devices for raising and lowering the bed be so arranged that the bed be raised to its stowed position and then secured in such position by auxiliary means provided for that purpose. Said raising and lowering devices may then be lowered in their inactive position and concealed within the hollow back 48 provided for that purpose on the front seat 47. Said raising and lowering devices may consist of two rack-bars 53 which are engaged by pinions 54 fixed to a common driving shaft 56. Said pinions are concealed by housings 55 fastened to the back 48 of said front seat 47. Said driving shaft 56 is provided with a squared end 57 upon which an operating crank can be mounted.

The upper ends of the rack-bars 53 are provided with heads 59 which bear in the cupped fittings 51ª affixed to the underside of the transverse bed supporting bar 51.

Similarly as in the previous figures, the transverse bar 51 is adapted to support the bed structure in stowed position, bearing against the same at a point intermediate the top bows 43ª and 44ª. The strips 49 of which the body of said bed is made are slightly flexible so that the pressure of said transverse bed supporting bar will cause said strips 49 to be flexed slightly to prevent the bed structure from shifting longitudinally of the automobile top 52 when said car is being driven.

In order to secure the bed in its stowed position, the ends of the bed supporting bar 51 are provided with longitudinally extensible arms 60. Said arms are provided with heads 63 adapted to fit the frame members 64 of the vehicle top 52, as is illustrated in Fig. 14. The extensible arms 60 are provided with elongated slots 62 in which thumb screws 61 are threaded into the transverse bed supporting bar 51. The extensible arm 60 may be retracted so as not to project beyond the ends of the bed supporting bar 51, when the latter is to be moved vertically so as to extend a lesser distance than the spacing between the side frame members 64 of said automobile top. When said bed has been lifted to its stowed position so that said transverse bed supporting bar extends above the side frame members 64 the arms 60 may be extended so as to rest on the top of said side frame members 64 so as to support the bed independently of the raising and lowering devices. The latter may then be lowered into their inactive positions where they are concealed within the hollow back 48 of the front seat 47.

In Figs. 18 to 22 inclusive, I show an embodiment which is preferably incorporated permanently in an automobile and I have shown in these views how the middle section of the back of the front seat can be hinged so that two parallel spaced beds can be provided and both of which can be arranged, when driving, so as not to take up any of the available seating capacity or auxiliary carrying capacity of the car. In these figures, also, I show a bed structure which is similar to the one shown in the preceding figures except that I show in Figs. 18 and 19 that the mattress 41ª can be channeled as at 65 so that it will straddle the top bows 44ᵇ and 43ᵇ. It is to be understood, however, that the mattress may be similarly recessed in any of the other embodiments so as to gain head room.

In these figures the bed structure is supported by a transverse member 66 which is provided with end members 67 which are adapted to be mounted on the side members 64ª of the automobile top. The transverse member is lifted and lowered from position by two spaced telescoping members 68 which are housed in the hollow back portion 69 of the front seat 70. These members 68 are similar to the members 53, in Figs. 13 to 17ª inclusive, and the members 18 and 19 in Figures 1 to 12 inclusive, and these members are connected by an operating shaft 56ª which is provided with a squared end 57ª. The middle section 71 of the back of the front seat between these members 68 is movable, being connected to the lower portion of this seat by hinges 72. This section 71 is provided with flanges 73 which overlie the stationary portion of the back seat so that when the section is in upright position it will aline with the remainder 71ª of the seat. I provide a locking arrangement 74, (see Fig. 22), which consists of an overhanging flange 75 which has a hole 76 which corresponds to the hole 77 in the upper portion of the section 71. In the holes 76 and 77 I place a pin 78 which passes through both holes when they are alined and holds the section 71 in upright position. This pin can be held out of engagement with the hole 77 by placing the projection 78ª in the groove 78ᵇ.

The shaft 56ª is provided at each end with rotatable pinions 79 which co-operate with the members 68 so as to lift and lower the bed structure, as previously described. I provide a pawl 27ª which holds the pinions 79 in set position and this pawl may be locked in place by the padlock 28ª.

I provide a vertical adjustment for the end members 67, by providing a fulcrum 80 at the approximate middle of the member 67. On its upper face and on its inner end I provide an adjustable thumb screw 81 which passes through the slotted hole 82 in the transverse member 66. On the other side of the fulcrum I provide the retaining lip 83 which overlies the member 64ª. I provide a number of grooves 66ª on the end piece so that the end pieces can be extended outwardly and thus various lengths of effective levers can be obtained, when the lip 83 overlies the member 64ª. The tightening of the thumb nut results in a vertical adjustment of the transverse member 66 and thus the bed may be held tightly in position even though the amount of bed clothing is varied slightly. When the end piece is adjusted the operating mechanism can be removed and the bed structure will be held tightly in raised position.

The provision of the hinged section 71 in the back of the front seat provides a second bed, on the cushions of the seats. The seat cushions are usually tapered slightly and thus I provide a hinged support 84 which can be placed under the thinner portions of these seats which lifts these portions so that the seat cushions and the hinged section of the back of the front seat will all be in substantial alinement. I provide a section of cushion 85 which is adapted to fill the gap formed between the abutting edges of the cushions on the front seat when the back is swung angularly downward, which may be carried, when not in use, under the front seat 70. I provide projecting pins 86 on the upper surface of the back of the front seat which engage the forward edge 87 of the back seat when the back of the front seat is arranged horizontally. The seat cushion 88 of the back seat, the cushion 89 of the hinged portion 71, the cushion 85 and the seat cushion 90 of the front seat form a continuous alined surface. It is possible by the provision of this hinged section in combination with the bed structure support from the top to obtain sleeping facilities for four or perhaps 5 persons within the car itself and the bed clothing for both bed structures, when not being used, can be carried upon the mattress 41ª where it does not occupy space required for seating the passengers when the car is being driven.

Although I have described my invention as constituting a bed to be placed in the top of a vehicle it is to be understood that said structure is equally capable of being used as a luggage container in which flat articles can be carried and it is also to be understood that if my invention is embodied in a bed that the curtains, camp equipment and the like can be carried on top of said bed when in stowed position, as well as the bed clothing and the like.

I claim:

1. A bed for vehicle provided with a top comprising, a vertically extensible support of sufficient length to extend in one adjustment to a point adjacent the top of the vehicle, said support being mounted centrally in the vehicle, a bed-bottom supported at the middle by said support, said bed-bottom being longitudinally flexible whereby when said support is fully extended the said bed-bottom will be bowed upwardly and thus stowed and concealed under the top of the vehicle.

2. A bed for vehicle provided with a top comprising, a vertically extensible support of sufficient length to extend in one adjustment to a point adjacent the top of the vehicle, said support being mounted centrally in the vehicle, means for extending and lowering said support, a bed-bottom supported at the middle by said support, said bed-bottom being longitudinally flexible whereby when said support is fully extended the said bed-bottom will be bowed upwardly and thus stowed and concealed under the top of the vehicle.

3. A bed for vehicle provided with a top comprising, a vertically extensible support of sufficient length to extend in one adjustment to a point adjacent the top of the vehicle, said support being mounted centrally in the vehicle, a bed-bottom supported at the middle by said support, said bed-bottom being longitudinally flexible, whereby when said support is fully extended the said bed-bottom will be bowed upwardly and thus stowed and concealed under the top of the vehicle and auxiliary means for securing the ends of the bed when stowed under the vehicle top.

4. A bed for vehicle provided with a top comprising, a vertically extensible support of sufficient length to extend in one adjustment to a point adjacent the top of the vehicle, a bed-bottom supported at the middle by said support whereby when said support is fully extended the said bed-bottom will be stowed and concealed under the top of the vehicle and auxiliary means for securing the bed when stowed under the vehicle top.

CHARLES W. MORDEN.